United States Patent

Dysard

[11] 4,023,428
[45] May 17, 1977

[54] PIVOTAL MOUNT FOR BELT-DRIVEN DEVICE

[75] Inventor: Howard A. Dysard, Waterford, Wis.

[73] Assignee: Allis-Chalmers Corporation, Milwaukee, Wis.

[22] Filed: Dec. 22, 1975

[21] Appl. No.: 643,317

[52] U.S. Cl. .................................. 74/242.13 R
[51] Int. Cl.² .................................. F16H 7/10
[58] Field of Search .......... 74/242.13 R, 242.15 R, 74/242.8, 242.12

[56] References Cited

UNITED STATES PATENTS

| | | | |
|---|---|---|---|
| 2,640,367 | 6/1953 | Rieser | 74/242.13 R |
| 2,796,091 | 6/1957 | Odlum et al. | 74/242.13 R X |
| 3,922,927 | 12/1975 | Shiki et al. | 74/242.13 R |

Primary Examiner—Leonard H. Gerin
Attorney, Agent, or Firm—Arthur L. Nelson

[57] ABSTRACT

A tensioning apparatus including a mount for pivotally supporting a belt-driven device having a housing with pivotal supports defining a pivotal axis with said mount. An adjustable tensioning means locks the device in its adjusted position.

10 Claims, 5 Drawing Figures

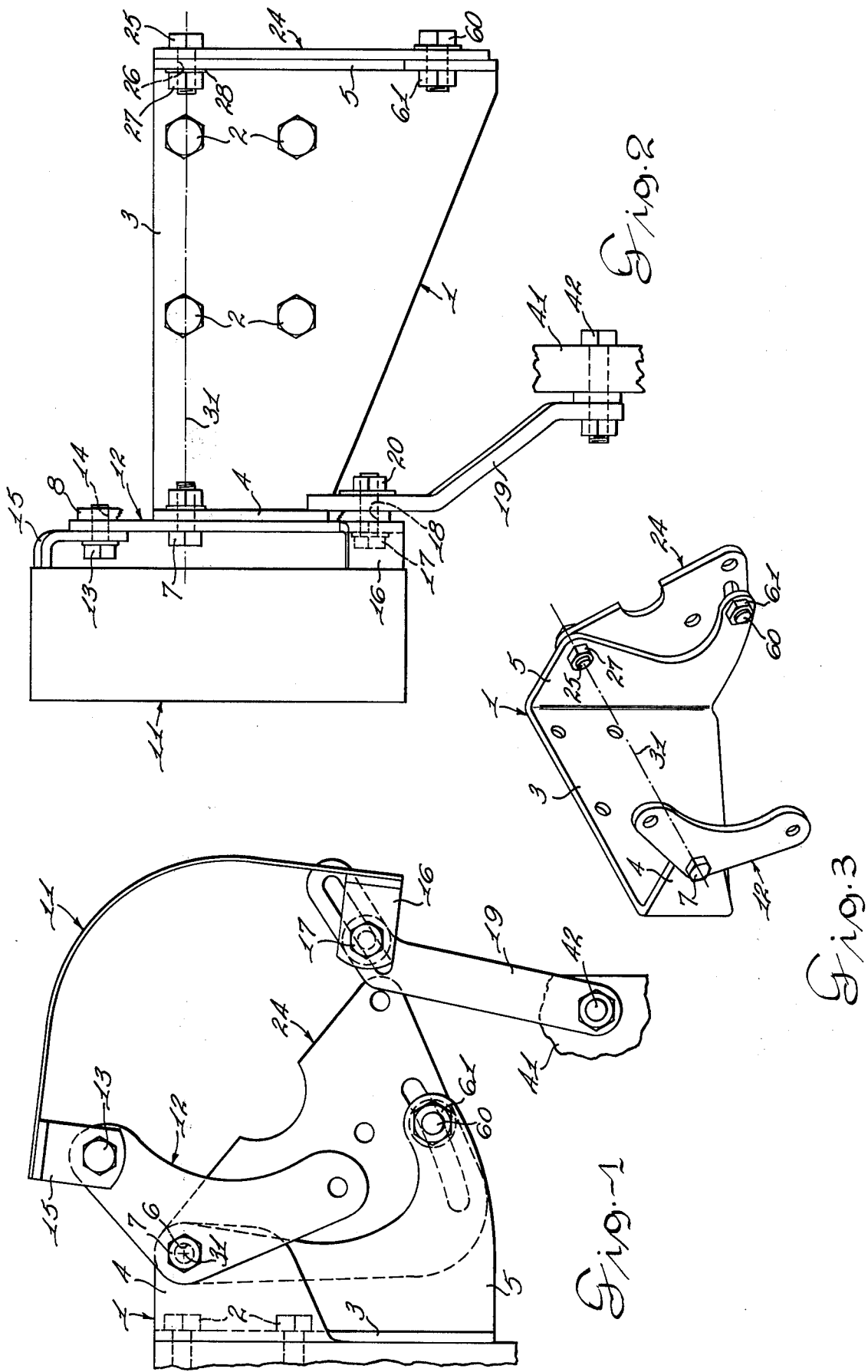

PIVOTAL MOUNT FOR BELT-DRIVEN DEVICE

This invention relates to a belt-tightening device and more particularly to a pivotal mount for a belt-driven device with belt-tightening and fastening means locking the device in its operating position.

Satisfactory operation of belt-driven devices requires an adjustment in tensioning of the belt since the belts stretch and wear during use. Conventional means of adjusting the belt may slide or pivot the belt-driven device and accordingly lengthen the dimension between centers of the drive and driven pulleys. A shortcoming of many of these devices which pivotally support a belt-driven device is that the mounting for the pivot is not rigid enough to prevent the device from vibrating during operation. For example, a single adjustable strap is used to lock the tensioning device once the adjustment is made. This is usually not adequate enough to maintain a parallel relationship between the drive and driven axes of the belt-driven device.

Accordingly, this invention provides for a solid base pivotally supporting the belt-driven device. An adjustable tensioning means is provided on each end of the belt-driven device to provide a more secure mount which is less sensitive to vibration. Once the tensioning means is adjusted the belt-driven device is securely fastened on its pivot point and the two points of adjustment to provide four solid mounting points to reduce vibration, maintain parallel alignment of drive and driven axes and reliable operation for the belt-driven device.

It is an object of this invention to provide a pivotal mount for a belt-driven device with belt-tightening means in the mount.

It is another object of this invention to provide a pivotal mount for a belt-driven device with extensions of the housing of the device pivotally supported on the mount and adjustment for tension of the belt integral with the support for the belt-driven device.

It is a further object of this invention to provide a mount for pivotal support of a belt-driven device with extensions of the housing of the belt-driven device pivotally supported on a base whereby the housing provides rigidity and the bolts forming the pivot and permitting adjustment on the mount operate as fastening means to adjustably vary the dimension between the axes of the driven pulley and the drive pulley.

The objects of this invention are accomplished by providing a mount for pivotally supporting a belt-driven device. Pivotal supporting plates are fastened to the housing which provides rigidity and the plates form an extension of the housing which are pivotally supported on the mount and define a single pivotal axis. The rigidity of the mount, the housing, and extensions of the housing maintain a parallel alignment of the axis of the drive pulley with the axis of the driven pulley in its operating position. The dimension between drive and driven axes is also maintained through a double adjustment on the adjusting means and fastening means which securely lock the belt-driven device once the adjustment is made.

Referring to the drawings the preferred embodiment of this invention is illustrated:

FIG. 1 illustrates an end view of the mount for the belt-driven device;

FIG. 2 illustrates a side-elevation view of the mount for pivotally supporting the belt-driven device;

FIG. 3 illustrates a three-dimensional view of the mount and the pivotal supports which form extensions of the housing of the belt-driven device and are pivotally supported on the mount;

Figure 5:
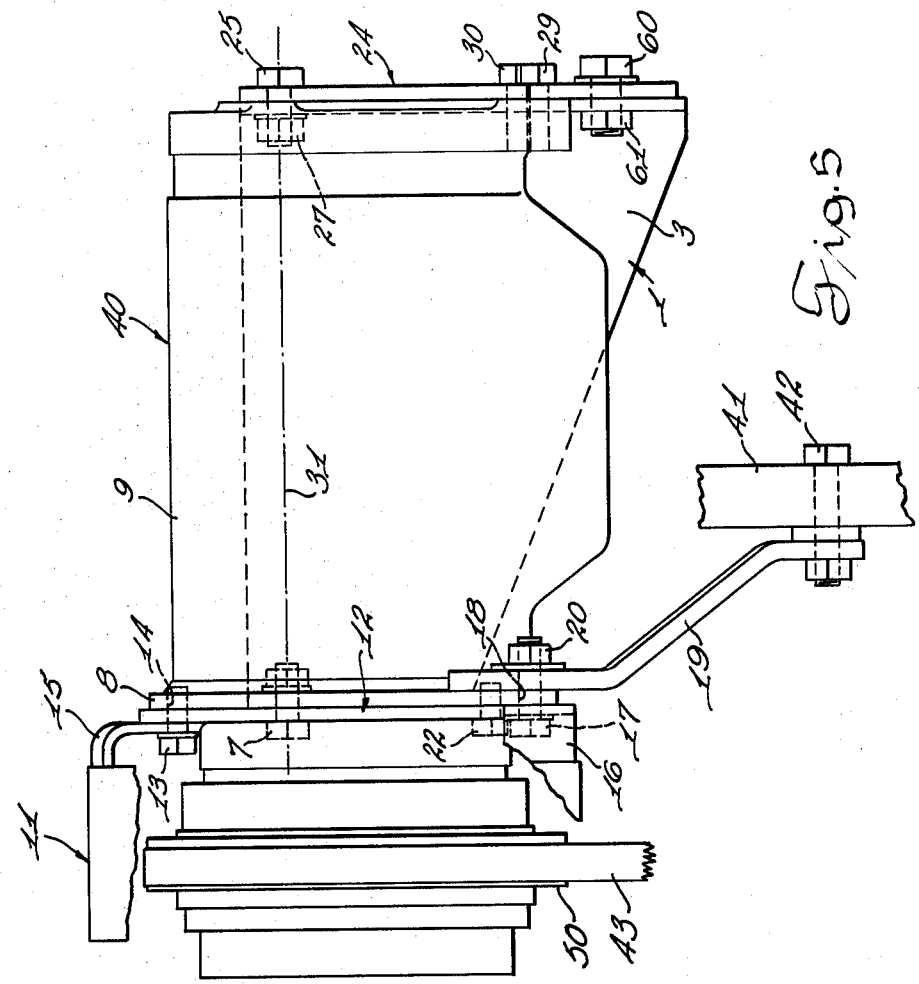
FIG. 5 illustrates a side view of the belt-driven device.
Figure 4:
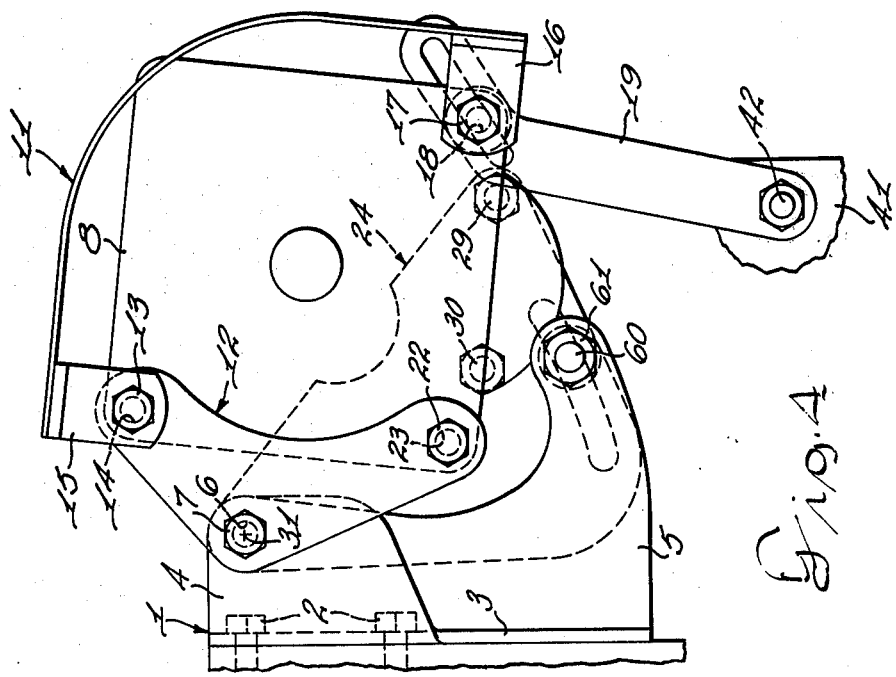
FIG. 4 illustrates an end view of the belt-driven device.

Referring to the drawings, FIGS. 1 and 2 illustrate the mounting for the belt-driven device. The mount 1 is fastened to a motor by means of a plurality of bolts 2. FIG. 3 also shows the base 3 of the mount 1 with the uprights 4 and 5. The upright 4 forms a bolt hole 6 which receives the bolt 7 which centrally supports the flange 8 on the housing 9. The shield 11 is supported by the brace 15 and brace 16 of the shield 11. The shield 11 is connected to the housing extension 12 by means of the bolt 13 which is fastened to the flange 8 in the threaded openings 14. The bolt 17 which threadedly engages the opening 18 in the flange 8 and extends through the strap 19 and fastens with nut 20. Accordingly, the flange 8 carries the shield 11 and is fastened by common bolts to supporting means.

The lower end of the housing extension 12 is fastened by the bolt 22 which extends through the extension and threadedly engages the opening 23 in the flange 8. The bolts 13 and 22 are locked in position by lock washers on the bolts.

The rear housing extension 24 is pivotally mounted on the bolt 25 which extends through the rear housing extension 24 and extends through the pivotal hole 26 and is fastened by means of the nut 27 and lock washer 28. The rear housing extension housing 24 is fastened to the housing 9 by means of the bolts 29 and 30 which extend through the extension 24 and threadedly engage an opening in the back end of the housing 9 of the belt-driven device 40. Accordingly, the belt-driven device is free to pivot on the axis 31, however, the bolts 7 and 25 are tightened to firmly hold the belt-driven device on the mount 1 when it is locked in the operating position.

The axis 31 formed by the mount and the supports is an axis parallel with the drive axis of the drive pulley. The distance between centers of the axes is a predetermined distance, but adjustable to compensate for wear and stretch of the belt which is used to drive the belt-driven device 40 as shown and described.

The operation of the device will be described in the following paragraphs.

The mount 1 defines an axis 31 to pivotally support a belt driven device 40 which has a housing 9 connected to the housing extensions 12 and 24. The housing extensions 12 and 24 of the housing 9 form the rigid integral structure which is pivotally supported on the axis 31. The dimension between the axis 31 and the drive axis of the drive pulley is determined by the adjustment provided in this device.

The mount 1 is preferably mounted on an engine and the drive axis is preferably the crankshaft axis which carries V-belt pulley which drives the V-belt pulley 50 on the belt-driven device 40. The strap 19 is mounted on a flange 41 of the engine and bolted by a bolt 42. The housing extensions 12 and 24 being integral with the housing 9 are pivotally supported on the axis 31. For a pivotal movement on the axis 31 the nut 20 is loosened on bolt 17 and the bolt 60 is loosened from nut 61. This allows a pivotal movement of the housing extensions 12 and 24. The housing 9 is pivoted upwardly until the belt 43 is tightened to the desired tension then the nut 61 is firmly tightened on the bolt 60 and nut 20 is firmly tightened on bolt 17 to lock the strap in a fixed position on the housing 12. Bolts 7 and 25 are then firmly tightened. This firmly locks the belt-driven device 40 in its adjusted position.

The embodiments of the invention in which an exclusive property or privilege is claimed are defined as follows:

1. An apparatus for tensioning a belt of a belt-driven device comprising, an integral mount including a base plate forming two upright ends defining two axially aligned pivot holes on a pivotal axis, a belt-driven device having a rigid housing, a pivotal support on each end of said housing forming extensions of said housing, means defining axially aligned openings in said supports, connecting means connecting said supports to said housing, fastening means pivotally fastening said supports on said upright ends of said integral mount aligning said openings and holes on said pivotal axis, means defining an adjusting slot in a first of said supports, a fastener received in said slot for adjustably positioning one of said supports on one of said uprights, a supporting link for adjustably supporting the other of said supports, said link defining a slot, a second fastener for adjustably supporting said other one of the said supports on said supporting link to thereby adjustably mount said belt-driven device in an infinite number of positions for tensioning of the drive belt.

2. An apparatus for tensioning a belt of the belt-driven device as set forth in claim 1 including, a pulley shield, a means for fastening a portion of said shield to one of said supports on said housing, and means fastening a second portion of said shield to said housing and said link for providing a housing mounted belt shield.

3. An apparatus for tensioning a belt of a belt-driven device as set forth in claim 1 wherein said connecting means connects said shield and one of said supports to said housing and said link.

4. An apparatus for tensioning a belt of a belt-driven device as set forth in claim 1 wherein said connecting means includes bolts connecting said supports integrally with said housing.

5. An apparatus for tensioning a belt of a belt-driven device as set forth in claim 1 wherein one of said uprights and said pivotal supports and one of said fasteners provide adjusting and fastening means for pivotally adjusting and fastening the belt-driven device on said mount.

6. An apparatus for tensioning a belt of a belt-driven device as set forth in claim 1 wherein said link defines support for one end of said belt-driven device.

7. An apparatus for tensioning a belt of a belt-driven device as set forth in claim 1 wherein said fastening means in said pivot holes on said mount and said fasteners in said adjusting means on said mount and said link define four supports in spaced relation to each other to form a rigid vibration resisting support for the belt-driven device.

8. An apparatus for tensioning a belt of a belt-driven device as set forth in claim 1 wherein one of said supports defining an extension of said housing includes, said connecting means includes a pair of bolts rigidly connecting said support to said housing, a bolt pivotally connecting said one of said supports with one of said uprights for adjustably fastening said pulley-driven device in its adjusted position.

9. An apparatus for tensioning a belt of a belt-driven device as set forth in claim 1 wherein said mount, said supports, and said link define metal supports of common thickness for supporting said belt-driven device.

10. An apparatus for tensioning a belt of a belt-driven device as set forth in claim 1 wherein said housing defines threaded openings for fastening said supports on said housing by means of said bolts.

* * * * *